United States Patent [19]

Steck

[11] Patent Number: 5,132,535

[45] Date of Patent: Jul. 21, 1992

[54] TRACK REGISTRATION DETECTOR FOR RADON CONCENTRATIONS

[76] Inventor: Daniel J. Steck, Rte. 2, Avon, Minn. 56310

[21] Appl. No.: 703,611

[22] Filed: May 21, 1991

[51] Int. Cl.$^5$ ............................ G01V 5/00; G01T 5/00
[52] U.S. Cl. ................................. 250/253; 250/472.1; 250/475.2; 250/255
[58] Field of Search ...................... 250/253, 255, 472.1, 250/475.2

[56] References Cited

U.S. PATENT DOCUMENTS

| | | | |
|---|---|---|---|
| 3,655,975 | 4/1972 | Evans | 250/475.2 |
| 3,665,194 | 5/1972 | Alter et al. | 250/83 |
| 4,518,860 | 5/1985 | Alter et al. | 250/253 |
| 4,704,537 | 11/1987 | Urban et al. | 250/472.1 |
| 4,920,272 | 4/1990 | Yoder | 250/475.2 |
| 4,992,658 | 2/1991 | Ramsey, Jr. et al. | 250/253 |

OTHER PUBLICATIONS

Pilcher et al., "Particle Tracks in Cellulose Nitrate", Amer. J. Phys., vol. 40, No. 5, pp. 679–683, May 1972.

Primary Examiner—Constantine Hannaher
Assistant Examiner—Edward J. Glick
Attorney, Agent, or Firm—Kinney & Lange

[57] ABSTRACT

A detector for radon concentrations is provided having a housing, a cover member and a track registration device. The housing has a groove defined by a base, an inner wall and an outer wall with the inner wall and the outer wall extending from the base. The cover member has a side wall and is supported on the housing. The side wall intersects the groove thereby forming a U-shaped channel. The U-shaped channel creates a path for entry of radon concentrations from an exterior of the housing to an interior of the housing. The track registration mechanism is supported entirely within the housing and is capable of developing tracks thereon caused by radon-generated alpha particles.

20 Claims, 3 Drawing Sheets

TRACK REGISTRATION DETECTOR FOR RADON CONCENTRATIONS

BACKGROUND OF THE INVENTION

The present invention relates to a detector for radon concentrations and, in particular, it relates to a radon detector having a tortuous channel for entry of radon into the detector.

Radon ($^{222}$Rn) is a heavy, radioactive, zerovalent gaseous element in Group O (inert gases) of the periodic table formed as a gaseous emanation from the radioactive decay of radium. The element is highly radioactive and has a half-life of 3.823 days. Radon decays by the emission of energetic alpha particles. All known isotopes from radon 204 to radon 224 are radioactive with short half-lives.

Generally, exposure to the radioactive emissions of radon is not dangerous to normal human skin. However, if the soft tissue of the human body is exposed to these radioactive emissions, damage can occur. Therefore, since any surface (including dust particles) exposed to radon becomes coated with an active deposit consisting of a group of short-lived daughter products, it is important to monitor the amount of radon in any given environment, including homes and work places. If radon attaches to dust particles and these particles are inhaled, then the lungs of the person which inhaled the radon contaminated dust particles will be exposed to potentially damaging radiation exposure.

Another isotope of radon is an alpha particle emitter known as $^{220}$Rn or thoron. Although exposing soft tissue to thoron emissions is also potentially harmful, thoron has a half-life of only 54.5 seconds. Such a short half-life reduces the risk of any dangerous effect of thoron.

Typically, radon monitoring techniques are carried out by placing one or more housings, each containing a strip of track registration material, in locations to be monitored (such as a mine or a dwelling), and permitting the detectors to remain at the monitored site for a preselected period of time, i.e., several weeks. After exposure, the housings are removed, the track registration material is subjected to a chemical etching solution, and the number of tracks etched per unit area on each strip is counted by microscopic inspection. The thus-obtained track data is then used to compute the average radon concentration at a monitored site.

Patents that describe detectors for radon and radon daughter products include Alter et al U.S. Pat. 4,518,860 and Urban et al U.S. Pat. No. 4,704,537. The Alter et al patent describes a detector for radon and radon daughter products having a housing with a removable closure cap for retaining a strip of track registration material. The strip is retained within the housing by upstanding ribs located closely adjacent diametrically opposed inner side wall portions of the housing. A microporous filter covers the interior of the housing. The cap has a central solid portion providing a radiation shield for the upper surface of the strip to enable the lower exposure surface to be distinguished after the detector has been retrieved from an exposure site.

The Urban et al patent describes a passive dosimeter including a diffusion chamber and an alpha particle detector located within the chamber. The diffusion chamber is constructed so that the interior is open to the outside. The size of the detector and the interior space are selected for causing the differences in path length of alpha particles and the interior space to permit the emission energy to be determined independently of the location decay events.

SUMMARY OF THE INVENTION

A detector for radon concentrations is provided having a housing, a cover member and a track registration device. The housing has a groove defined by a base, an inner wall and an outer wall with the inner wall and the outer wall extending from the base. The cover member has a side wall and is supported on the housing. The side wall intersects the groove thereby forming a U-shaped channel. The U-shaped channel creates a path for entry of radon concentrations from an exterior of the housing to an interior of the housing. The track registration device is supported entirely within the housing and is capable of developing tracks thereon caused by radon-generated alpha particles.

In a preferred embodiment, the detector has a securing device for releasably securing the covering device to the housing. In addition, preferably the detector has a sealing mechanism between the outer wall and the inner wall to selectively seal the interior of the housing from radon concentration entry when desired.

DETAILED DESCRIPTION OF THE PREFERRED EMBODIMENTS

Figure 1:
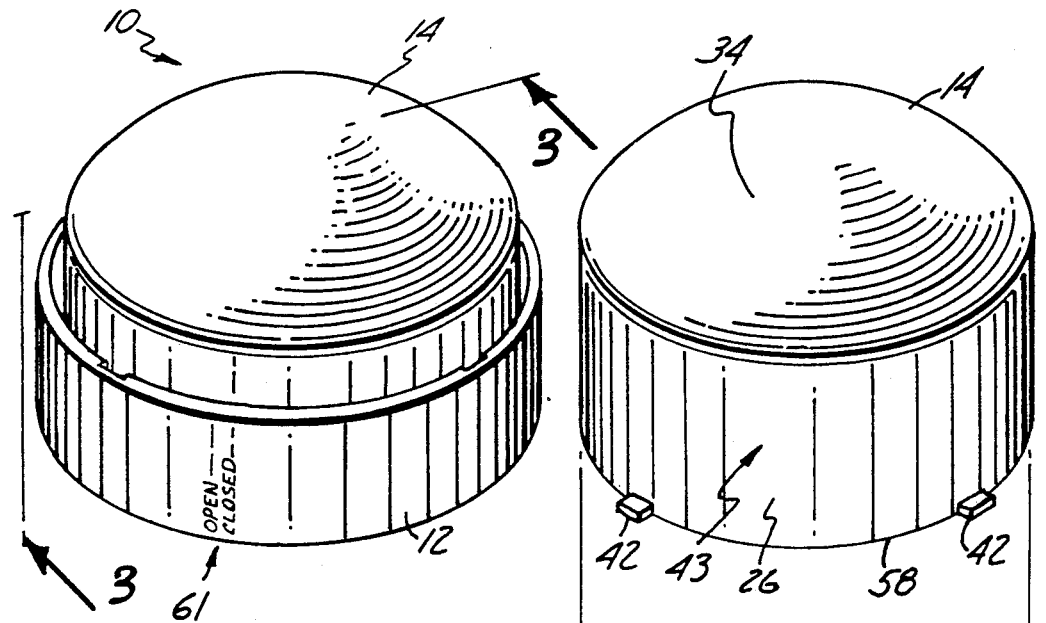
FIG. 1 is a perspective view of the radon detector of the present invention.
Figure 2:
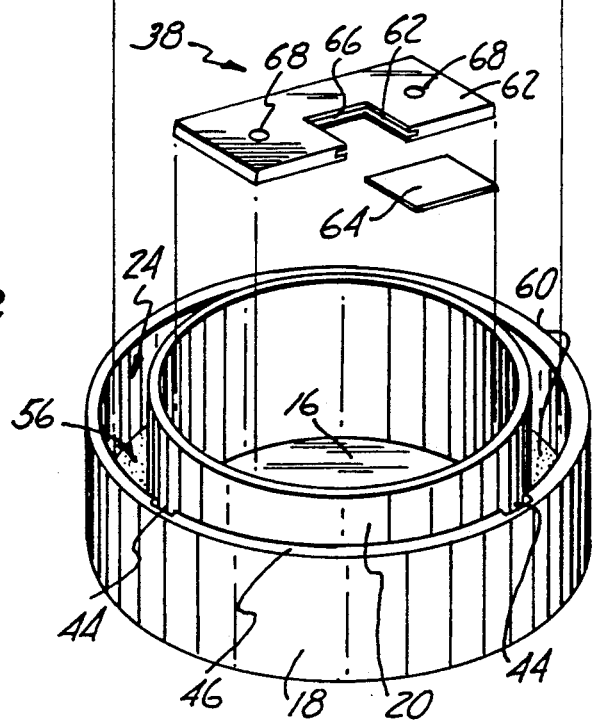
FIG. 2 is an exploded view of the detector of the present invention.

The detector, indicated generally at 10 in FIG. 1, of the present invention is a passive radon dosimeter that measures radon ($^{222}$Rn) concentration free from contamination of airborne radon decay products, thoron concentrations and thoron decay products. The detector 10 comprises an enclosure or housing 12 and a cover lid 14. As illustrated in FIG. 2, the housing 12 includes a base 16, an outer wall 18 and an inner wall 20. In the preferred embodiment, the configuration of the base 16 is round with the outer wall 18 extending concentrically from the base 16.

Figure 3:
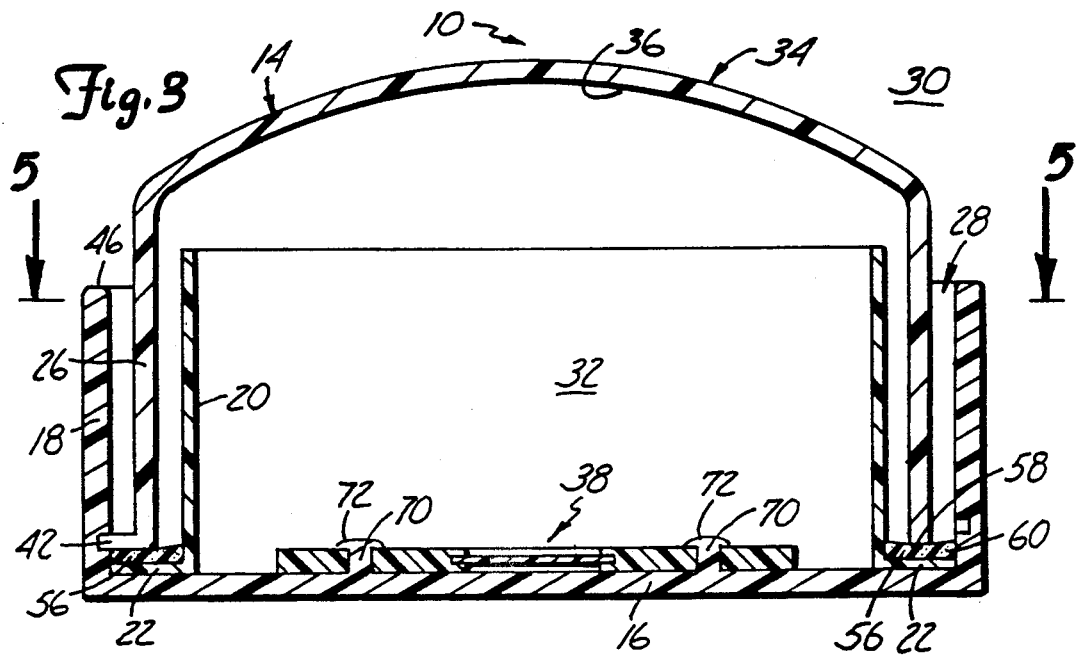
FIG. 3 is a sectional view taken along line 3—3 in FIG. 1 illustrating the detector in a closed position.

As illustrated in FIG. 3, the inner wall 20 includes a flange portion 22 substantially perpendicular and integral to the inner wall 20. The flange portion 22 projects radially outward away from the inner wall 20 and toward the outer wall 18. The flange portion 22 rests upon the base 16 and is positioned such that the inner wall 20 and the flange portion 22 fit snug within the confines of the outer wall 18. A low radon permeability grease such as DOW CORNING 907 brand grease, is applied between the flange portion 22 and the base 16 to prevent the passage of radon concentrations between the flange portion 22 and the base 16.

As illustrated in FIG. 2, the housing 12 further includes a groove 24 defined by the outer wall 18, the inner wall 20 and the flange portion 22. In FIG. 2, a side wall 26 of the cover lid 14 is received between the outer wall 18 and the inner wall 20 and intersects the groove 24 thereby forming a U-shaped channel 28. In a preferred embodiment, the side wall 26 bisects the groove 24. The U-shaped channel 28 creates a path for entry of radon concentrations from an exterior 30 of the housing 12 to an interior 32 of the housing 12.

The housing 12 and the cover lid 14 are both constructed of materials having short radon diffusion lengths as compared to the materials' thickness. The appropriate material is developed from a low radondiffusivity material such as low radon permeability, electrically conducting polymer(s). Low radon permeability polymers prevent radon concentrations from passing through the housing 12 and the cover lid 14. In general, polymers have a wide range of radon "permeabilities" and "solubilities". Suitable polymers for use in the detector 10 of the present invention, having a thickness of approximately 1.5 millimeters, include polyester, polycarbonate, polypropylene, and high density polyethylene.

As radon and thoron concentrations present in the testing environment travel the path of the U-shaped channel 28 toward the interior 32 of the housing 12, the radon and thoron concentrations begin to decay thereby producing radon decay products and thoron decay products. Radon decay products and thoron decay products are electrically charged and will adhere to the electrically conducting polymers in the housing 12 and the cover lid 14 prior to the decay products reaching the interior 32 of the housing 12. The U-shaped channel 28 has a sufficient length and width to reduce the amount of radon decay products and thoron decay products in the interior of the housing 12 to below-detectable levels. This includes the radon decay products and the thoron decay products borne in the U-shaped channel 28 from the decay of the radon and thoron concentrations present in the U-shaped channel 28.

In order to prevent thoron concentrations from reaching the interior 32 of the housing 12, the U-shaped channel 28 must have a length sufficient to reduce thoron concentrations to below-detectable thresholds. As mentioned previously, thoron has a half-life of approximately 54.5 seconds. The length of the channel 28 is designed to have a length of more than two thoron diffusion lengths; one thoron diffusion length equals approximately 1.25 centimeters. This length is sufficient to allow for detectable levels of thoron concentrations to "die" in the channel 28 and never reach the interior 32 of the housing 12.

As best illustrated in FIG. 3, the cover lid 14 includes a top wall 34. The top wall 34 has a top wall surface 36 which is preferably rounded. The curved geometry of the top wall surface 36 provides additional surface area for adherence of the electrically charged radon decay products. In addition, the top wall surface 36 focuses the radon concentrations entering the interior 32 of the housing 12 via the U-shaped channel 28 onto a track registration 38 device releasably secured to the housing 12. By having the track registration device 38 positioned at the approximate focal point of the top wall surface 36, tracks of radon will be produced on the track registration device 38 at a certain angle and density. In experimental testing utilizing the rounded top wall surface 36, large calibration coefficients have been generated with the detector 10 of the present invention which measure 1.5 times higher than other radon detectors currently on the market. The track registration device 38 will be discussed in greater detail later.

Figure 5:
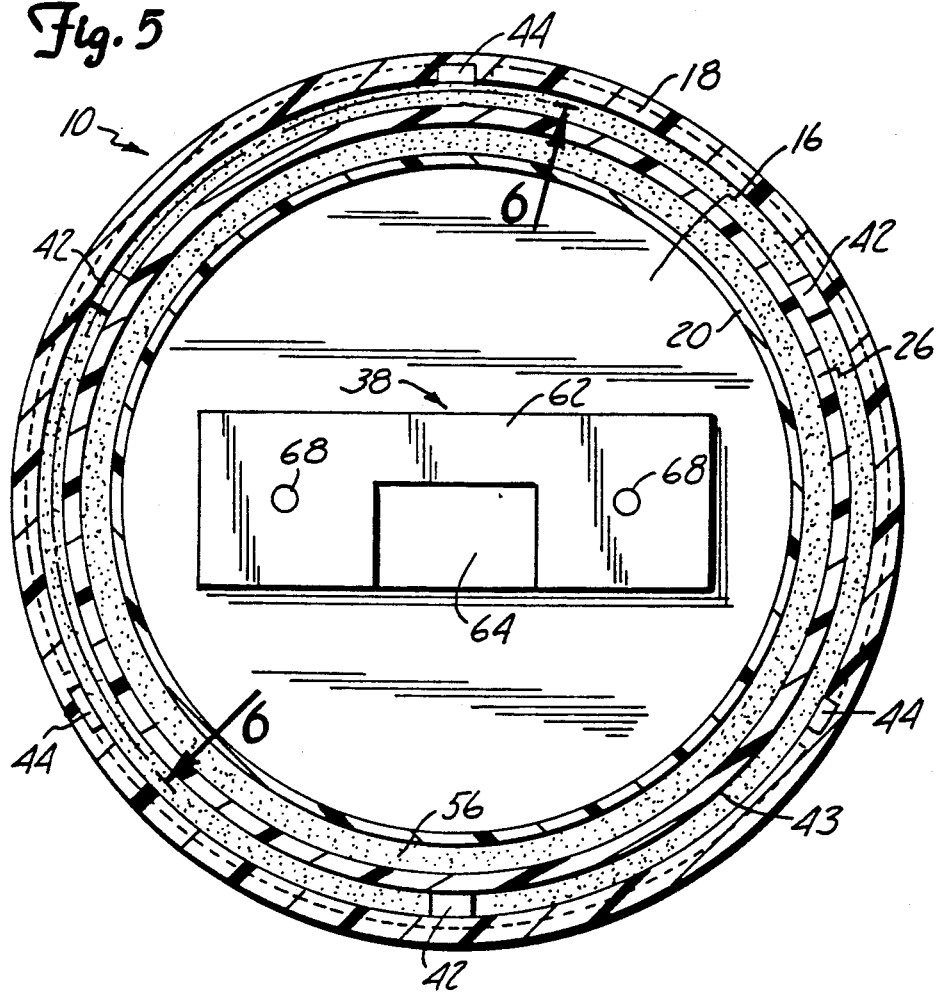
FIG. 5 is a sectional view taken along line 5—5 in FIG. 3.

The cover lid 14 is releasably secured to the housing 12. As illustrated in FIG. 2, the cover lid 14 preferably includes a plurality of tab members 42 protruding from an outer surface 43 of the side wall 26. In FIG. 5, there are three tab members 42 illustrated with each tab member 42 located equidistant from each adjacent tab member 42 or 120° about the outer surface 43 of the side wall 26. In addition, the tab members 42 are preferably integral to the side wall 26.

Figure 6:
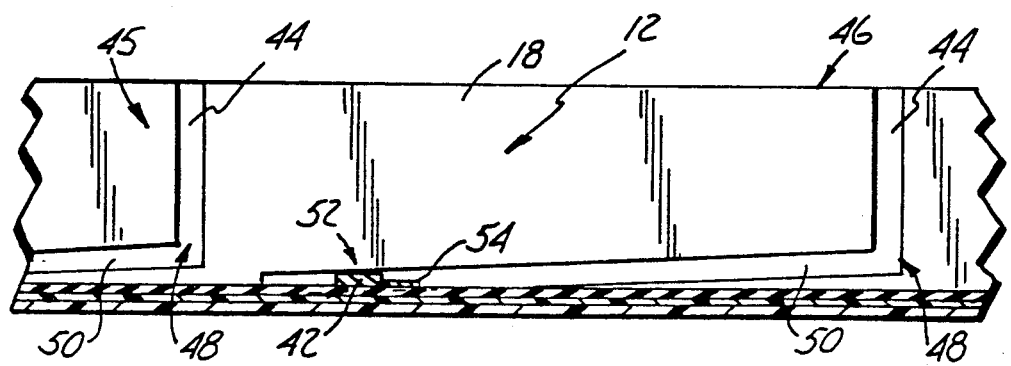
FIG. 6 is a sectional view taken along line 6—6 in FIG. 5.

As illustrated in FIG. 6, a plurality of slots 44 are provided on an inner surface 45 of the outer wall 18 to receive the tab members 42. The slots 44 extend from a rim 46 of the outer wall 18 to a first position 48 adjacent the base 16. In FIG. 5, there are three slots 44 illustrated with each slot 44 located equidistant from each adjacent slot 44 or 120° about the inner surface 45 of the outer wall 18.

Once again, referring to FIG. 6, a plurality of passages 50 oriented substantially circumferentially around the inner surface 45 of the outer wall 18 is provided. Each of the passages 50 extends from the first position 48 and angles toward a second position 52 adjacent the base 16. In addition, each passage 50 includes a bump or ridge 54 to prevent accidental opening of the detector 10 when the detector 10 is in a closed position.

Figure 4:
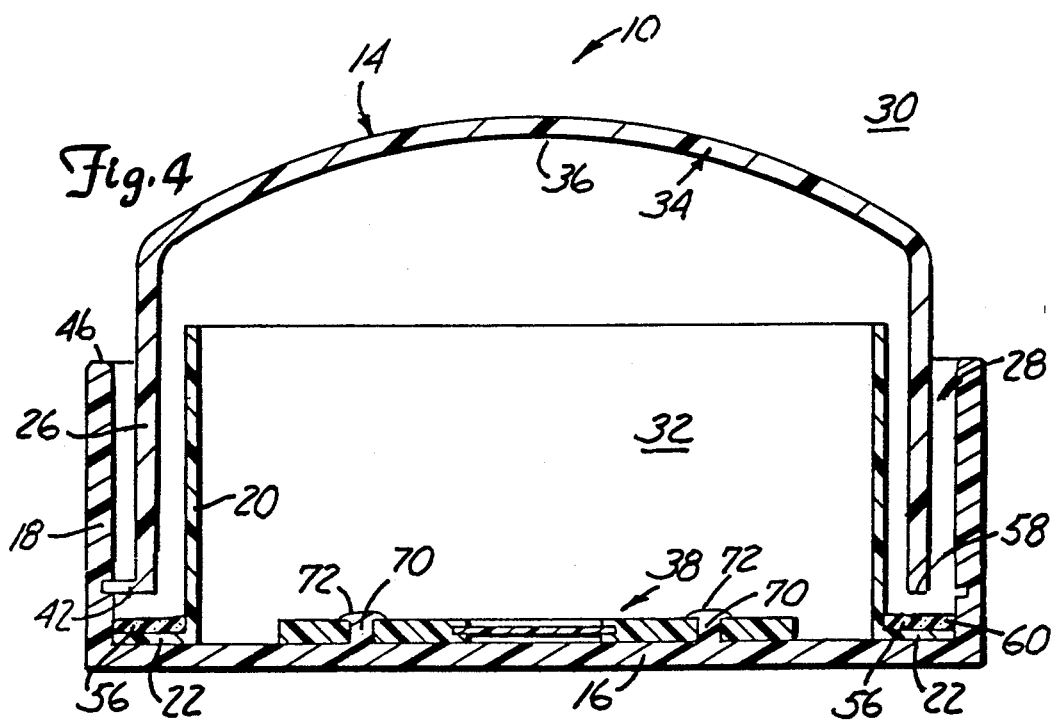
FIG. 4 is a sectional view taken along line 3—3 in FIG. 1 illustrating the detector in an open position.

As illustrated in FIGS. 3 and 4, a low-radon permeability barrier or sealing device 56 is provided between the outer wall 18 and the inner wall 20. The sealing device seals the interior 32 of the housing 12 from radon concentration entry via the U-shaped channel 28 when an edge portion 58 of the cover lid 14 is secured against the sealing device 56. In the preferred embodiment, the sealing device 56 comprises a gasket 60 resting upon the flange portion 22. The sealing device 56 is configured to adapt to the cross-sectional configuration of the housing 12. Thus, if the housing 12 has a circular cross-sectional configuration, the sealing device 56 is in the shape of an O-ring.

The material used in the construction of the sealing device 56 is preferably rubber. In order to further seal the housing 12 to prevent the entry of radon concentrations, the sealing device 56 is coated with a low-radon permeability grease such as DOW CORNING 907 brand grease.

In FIG. 2, the track registration device 38 is supported entirely within the housing 12. The track registration device 38 includes a chip holder 62 and a chip 64. The chip 64 is releasably secured within the chip holder 62 and is capable of developing tracks thereon caused by radon-generated alpha particles. The chip holder 62 is constructed of the same types of low radon permeability material as the housing 12 and the cover lid 14.

Since the chip 64 may develop tracks that are not related to the radon-generated alpha particles of the testing environment, it is necessary to protect a portion of the chip 64 from radon concentration exposure. Therefore, the chip holder 62 includes a guide 66 with the guide 66 sized and shaped to releasably receive the chip 64. The guide 66 receives the chip 64 and protects at least a portion of the chip 64 within the guide 66 from exposure to radon-generated alpha particles.

To releasably attach the chip holder 62 to the base 16 at the focal point of the rounded top wall 36, the chip holder 62 includes a plurality of apertures 68 and, as illustrated in FIG. 3, the base 16 of the housing 12 includes a plurality of studs 70. Each of the apertures 68 has a slightly greater diameter than the diameter of each of the studs 70. In addition, each of the studs 70 has a knob portion 72 near its tip. The diameter of each of the knob portions 72 being slightly greater than the diameter of each of the apertures 68.

The chip holder 62 is releasably attached to the base 16 of the housing 12 by inserting each of the studs 70 into a corresponding aperture 68 and forcing the knobs 72 through the apertures 68. Upon completion of the testing, the chip holder 62 is removed by simply forcing the apertures 68 back over the knobs 72 until the chip holder 62 is released from studs 70 of the housing 12.

After exposure to radon concentrations, the chip 64 can remain in the chip holder 62 where it can be treated, inventoried and identified easier than if the chip 64 were to be removed. The chip holder 62 is approximately the size of a standard microscope slide so that the tracks may be read and counted under an ordinary microscope without the need for special mounting.

To assemble the detector 10 of the present invention, the tab members 42 are inserted into the slots 44 until the tab members 42 reach the first position 48 adjacent the base 16. The cover lid 14 is then rotated thereby guiding the tab members 42 into the passages 50. As best illustrated in FIG. 3, the cover lid 14 is rotated until the edge portion 58 of the side wall 26 is secured against the sealing device 56 with the tab members 42 positioned between the ridge 54 and the sealing device 56. The detector 10 of the present invention is now ready for shipment to the place of intended use or can be stored for future use.

As illustrated in FIG. 4, when testing is required, the cover lid 14 is rotated in the opposite direction thereby guiding the edge portion 58 of the side wall 26 away from the sealing device 56 and guiding the tab members 42 over the ridge 54 and through the passage 50. The cover lid 14 is rotated until the width of the opening between the edge portion 58 of the side wall 26 and the sealing device 56 is approximately equal to or slightly greater than the width between the outer wall 18 and the side wall 26 and the inner wall 20 and the side wall 26. In Figure markings 61 on the housing 12 and the cover lid 14 assist in determining the correct position of the cover lid 14 in relation to the housing 12.

The tortuous configuration of the U-shaped channel 28 gives the detector 10 a response time of approximately one hour. Response time is defined as the amount of time necessary to achieve seventy (70%) percent of equilibrium. That is, after approximately one hour of testing, the radon concentration within the interior 32 of the housing 12 will be approximately seventy (70%) percent of the radon concentration on the exterior 30 of the housing 12.

After approximately two hours of testing, the detector 10 of the present invention will achieve equilibrium. That is, after approximately two hours, the radon concentration on the interior 32 of the housing 12 will be approximately one-hundred (100%) percent of the radon concentration on the exterior 30 of the housing 12.

Models of the detector 10 of the present application have been successfully tested in atmospheres having radon and thoron concentrations. The following are results of a test conducted with the detector 10 of the present invention:

Radon ($^{222}$Rn) sensitivity:
    Open position: 0.08 tr/mm$^2$/pCi-days/liter
    @ exposures from 30 to 1300 pCi
    Closed position: <0.003 tr/mm$^2$/pCi-days/liter
    @ exposures up to 320 pCi
Thoron ($^{220}$Rn) sensitivity:
    Open position: <0.002 tr/mm$^2$/pCi-days/liter The following are radon sensitivity and thoron sensitivity performance tests conducted with the detector 10 of the present invention and various other radon detectors currently on the market:
Detector of the present invention
    Radon Sensitivity:
        Open position: 0.078 tr/mm$^2$/pCi-days/liter
        Closed position: <0.002 tr/mm$^2$/pCi-days/liter
    Thoron Sensitivity:
        Open position: <0.002 tr/mm$^2$/pCi-days/liter
        Closed position: <0.002 tr/mm$^2$/pCi-days/liter
        Thoron/Radon %: <3
Radtrack[1] (Tech Ops/Landauer Inc.)
    Radon Sensitivity: 0.026 tr/mm$^2$/pCi-days/liter
    Thoron Sensitivity: 0.021 tr/mm$^2$/pCi-days/liter
    Thoron/Radon %: 75

[1] Pearson, M.B., *Calibration of Alpha-track Monitors for Measurement of Thoron*, Proceedings of the 1990 International Symposium on Radon and Radon Reduction Technology: Volume II; USEPA; Atlanta, Georgia, 1990.

TrackEtchSF (Terradex)
    Radon Sensitivity: 0.015 tr/mm$^2$/pCi-days/liter
    Thoron Sensitivity: 0.0094 tr/mm$^2$/pCi-days/liter
    Thoron/Radon %: 63
TrackEtchF (Terradex)
    Radon Sensitivity: 0.046 tr/mmhu 2/pCi-days/liter
    Thoron Sensitivity: 0.0133 tr/mm$^2$/pCi-days/liter
    Thoron/Radon %: 29

By comparing the results of the performance tests, it is evident that the detector 10 of the present invention is more effective in preventing the entry of thoron concentrations than the other models. Therefore, a more accurate reading of the radon concentration in the testing environment is produced.

It can also be seen from the above performance tests that the thoron concentration sensitivity of the present invention is the same in the open position as in the closed position. This data supports the fact that the amount of thoron reaching the chip 64 via the U-shaped channel 28 of the present invention is negligible.

On the other hand, all of the other abovetested commercial models have radon-entry mechanisms and geometries similar to each other, but different from the detector 10 of the present invention. Therefore, it would follow that the thoron concentration sensitivities of each of the other models would be similar to their radon concentration sensitivities since these models have no way of preventing the thoron concentration from entering the detector 10 without preventing the entry of radon concentrations.

Other uses of the detector 10 of the present invention include measuring thoron concentrations by a difference method used in conjunction with a radonthoron sensitive (open) chamber. To measure thoron concentrations, the channel length would be reduced and the difference in track density between this modified device and an unmodified device as described above would reflect the thoron concentration.

In addition, the detector 10 could be used to measure the concentrations of other radioactive noblegases (Xe and Kr) produced in nuclear-fuel cycle operations from charged or particulate decay products.

In summary, the detector 10 of the present invention has numerous improvements over existing alphatrack detectors such as those tested above and the detectors discussed in the Background of the Invention. Several of these advantages include:

1. Ability to open-close sensitive volume which eliminates the need to enclose detectors in "Rnproof" bags.

2. Allows for either continuous or discontinuous monitoring. The chip shield is used to correct each detector for preemplacement contamination (movable cover could also be used as post-emplacement shield).

3. No thoron concentration interference which gives a more reliable assessment of health-related risk.

Although the present invention has been described with reference to preferred embodiments, workers skilled in the art will recognize that changes may be made in form and detail without departing from the spirit and scope of the invention.

What is claimed is:

1. A detector for radon concentrations, the detector comprising:
   a housing having a groove defined by a base, an inner wall and an outer wall, the inner wall and the outer wall extending from the base;
   a cover member having a side wall, the cover member being supported on the housing, the side wall intersecting the groove thereby forming a U-shaped channel, the U-shaped channel creating a path for entry of radon concentrations from an exterior of the housing to an interior of the housing; and
   track registration means supported entirely within the housing, the track registration means capable of developing tracks thereon caused by radon-generated alpha particles.

2. The detector of claim 1 wherein the side wall bisects the groove.

3. The detector of claim 1 wherein the housing and the cover member have a substantially circular cross-section.

4. The detector of claim 1 wherein the base is integral to the outer wall.

5. The detector of claim 1 wherein the inner wall has flange portion extending outward from the inner wall such that the flange portion rests on the base thereby snugly securing the inner wall within the outer wall.

6. The detector of claim 1 wherein the housing and the cover member comprise a low alpha activity holder material selected from the group consisting of polyester films, solid polycarbonate, polypropylene and high density polyethylene.

7. The detector of claim wherein the cover member includes a top wall integral to the side wall.

8. The detector of claim 7 wherein the top wall is rounded such that radon concentrations entering the interior of the housing via the U-shaped channel are substantially focused on onto the track registration device.

9. The detector of claim 1 and further comprising securing means for releasably securing the cover member to the housing.

10. The detector of claim 9 wherein the side wall of the cover means has an outer surface facing the outer wall of the housing and the outer wall of the housing has an inner surface facing the inner wall of the housing, the securing means comprising:
    a plurality of tab members protruding from the outer surface of the side wall;
    a plurality of slots shaped and sized to receive the tab members, the slots being formed on the inner surface of the outer wall and extending from a rim of the outer wall to a first position adjacent the base;
    a plurality of passages oriented substantially circumferentially around the inner surface of the outer wall, each of the passages further extending from the first position adjacent the base and angling toward the base, each passage terminating at a second position adjacent the base.

11. The detector of claim 1 and further comprising sealing means between the outer wall and the inner wall to tend to seal the housing from radon entry.

12. The detector of claim 11 wherein the sealing means comprises a gasket.

13. The detector of claim 12 wherein the gasket is in the shape of an O-ring.

14. The detector of claim 12 wherein the gasket is rubber.

15. The detector of claim 12 wherein the gasket is coated with a low permeability grease.

16. The detector of claim wherein the track registration means includes a chip holder and a chip, the chip releasably secured to the chip holder and capable of developing tracks thereon caused by radongenerated alpha particles.

17. The detector of claim 16 wherein the chip holder protects a portion of the chip from receiving exposure to radon-generated alpha particles.

18. The detector of claim 16 wherein the chip holder includes a guide, the guide sized and shaped to releasably receive the chip.

19. The detector of claim 16 wherein the chip holder includes a plurality of apertures and the base includes a plurality of studs, each aperture receiving a corresponding stud to releasably secure the chip holder within the housing.

20. The detector of claim 19 wherein each of the studs includes a knob portion for releasably securing the chip holder within the housing.

* * * * *

UNITED STATES PATENT AND TRADEMARK OFFICE
CERTIFICATE OF CORRECTION

PATENT NO. : 5,132,535
DATED : July 21, 1992
INVENTOR(S) : DANIEL J. STECK

It is certified that error appears in the above-identified patent and that said Letters Patent is hereby corrected as shown below:

Col. 7, line 50, delete "claim", insert "claim 1"

Col. 8, line 34, delete "claim", insert "claim 1"

Col. 8, line 37, delete "radongenerated", insert "radon-generated"

Signed and Sealed this

Thirty-first Day of August, 1993

Attest:

BRUCE LEHMAN

*Attesting Officer*     *Commissioner of Patents and Trademarks*